(12) United States Patent
Frank et al.

(10) Patent No.: US 7,242,955 B2
(45) Date of Patent: Jul. 10, 2007

(54) METHOD AND APPARATUS FOR OPTIMAL MULTIPLE BEAM TRANSMIT WEIGHTINGS FOR BEAM TO BEAM HANDOFF IN A SWITCHED BEAM SYSTEM

(75) Inventors: Colin Frank, Chicago, IL (US); Yuda Y. Luz, Buffalo Grove, IL (US); Keith A. Tenbrook, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 166 days.

(21) Appl. No.: 10/740,278

(22) Filed: Dec. 18, 2003

(65) Prior Publication Data
US 2005/0136963 A1    Jun. 23, 2005

(51) Int. Cl.
*H04B 1/04* (2006.01)

(52) U.S. Cl. .............. 455/522; 455/101; 455/103; 455/562.1

(58) Field of Classification Search .......... 455/513, 455/101, 562.1, 446, 561, 562, 103; 342/378; 370/319, 335
See application file for complete search history.

(56) References Cited

U.S. PATENT DOCUMENTS

| | | | |
|---|---|---|---|
| 6,055,230 A | | 4/2000 | Feuerstein et al. |
| 6,094,165 A | | 7/2000 | Smith |
| 6,178,333 B1 | | 1/2001 | Feuerstein et al. |
| 6,330,460 B1 | * | 12/2001 | Wong et al. ............ 455/562.1 |
| 6,463,303 B1 | * | 10/2002 | Zhao ....................... 455/562.1 |
| 6,466,166 B2 | * | 10/2002 | Nakagawa ................ 342/378 |
| 6,901,062 B2 | * | 5/2005 | Scherzer et al. .......... 370/335 |
| 2002/0051430 A1 | * | 5/2002 | Kasami et al. ............ 370/319 |
| 2002/0128027 A1 | * | 9/2002 | Wong et al. ............... 455/513 |
| 2003/0092379 A1 | | 5/2003 | Brother, Jr. et al. |
| 2003/0190897 A1 | * | 10/2003 | Lei et al. ................... 455/101 |
| 2004/0023657 A1 | * | 2/2004 | Lim ........................... 455/446 |
| 2004/0063468 A1 | * | 4/2004 | Frank ........................ 455/561 |
| 2004/0137949 A1 | * | 7/2004 | Harris .................... 455/562.1 |
| 2004/0204108 A1 | * | 10/2004 | Etkin et al. ............. 455/562.1 |

FOREIGN PATENT DOCUMENTS

| | | |
|---|---|---|
| EP | 1 087 545 A | 3/2001 |
| WO | WO 01/35548 A | 5/2001 |
| WO | WO-01/47148 A2 | 6/2001 |
| WO | WO 02/27972 A | 4/2002 |

OTHER PUBLICATIONS

ETSI: "Universal Mobile Telecommunications System (UMTS); Physical layer procedures (TDD) (3GPP TS 25.224 version 5.4.0 Release 5)" ETSI TS 125 224 V 5.4.0, Mar. 31, 2003, pp. 1-47.

* cited by examiner

*Primary Examiner*—Joseph Feild
*Assistant Examiner*—Michael Vu

(57) ABSTRACT

A method, apparatus and system are provided for use in better optimizing switched beam, wireless communications. In some embodiments, a method is provided that receives a communication over a first wireless reverse link beam, selects a type of beam weighting control, determines a rule according to the type of beam weighting control, and determining a weighting of a forward link beam according to the rule. The method can further determine an energy of the first reverse link beam, and determine a first gain energy ratio based on the first reverse link beam energy, such that the weighting is determined by applying the first gain energy ratio to the rule. Some embodiments further determine a pilot beam configuration, wherein the rule is determined according to the pilot beam configuration and the selected type of beam weighting control.

7 Claims, 8 Drawing Sheets

METHOD AND APPARATUS FOR OPTIMAL MULTIPLE BEAM TRANSMIT WEIGHTINGS FOR BEAM TO BEAM HANDOFF IN A SWITCHED BEAM SYSTEM

FIELD OF THE INVENTION

The present invention relates generally to wireless communication, and more particularly to the better optimization of transmitting wireless communications over a wireless system.

BACKGROUND OF THE INVENTION

In a switched beam system, the wireless communication beams are fixed. As such, wireless mobile devices must be handed off from one beam to the next as the mobile travels around a base station. Some wireless systems may employ hard handoff between beams (that is, the system does not provide any momentary overlapping coverage utilizing two or more beams). Hard handoffs are not desirable, however, as they may result in increased dropped calls and may reduce the overall system capacity relative to other handoff methods CDMA supports softer-handoffs between sectors, in which multiple sectors transmit to the mobile simultaneously, but softer-handoff relies on assistance from the mobile in the form of pilot signal strength measurements. Since the beams share a common pilot signal, pilot measurements from the mobile cannot distinguish between the beams, and thus the mobile cannot assist the base station in the selection of the transmit beams.

In at least some prior switched beam systems, there are typically multiple beams per sector, and one or more of these beams can be used to transmit to an intended wireless mobile device. The use of the multiple beams depends on both the wireless standard (e.g., CDMA, CDMA2000, and so forth) and the implementation of the standard. The optimal use of the beams depends on the pilot configuration; more specifically on whether or not (i) the standard and the mobile support the use of per-beam pilot signals; (ii) the standard and the mobile support the use of per-user pilot signals; or (iii) if only a common pilot signal can be used.

Softer handoffs between sectors of the same bases station is typically done in a mobile-assisted fashion using pilot strength measurements taken by the mobile and transmitted to the base station. For softer handoff:
1) typically all sectors transmit the traffic channel to a particular mobile with the same power allocation;
2) the mobile has knowledge if a sector is transmitting a signal intended for the mobile; and
3) the mobile combines the signal from a particular base station sector only if that sector is transmitting to the mobile.

For beam-to-beam handoff, the situation is usually somewhat different. Generally, with only a common pilot, the mobile does not know which beams within the sector are transmitting to the mobile and the mobile cannot separate and identify the signals from the different beams. Thus, the mobile combines the signal contributions from all beams that can be detected.

These handoff techniques appear to allow the transfer of a mobile from one beam to another. However, problems with previous systems limit the effectiveness of the transfers and inhibit some implementations. Further, previous systems can be expensive to implement because of the problems these systems must attempt to overcome. These systems often drop calls, have limited functionality, have reduced and/or limited system capacity and typically require additional circuitry. These limitations reduce the systems overall effectiveness and frustrate customers.

BRIEF DESCRIPTION OF THE DRAWINGS

The above needs are at least partially met through provisions of methods, apparatuses, and/or systems for use in switched beam, wireless communications, where wireless communications are better optimized, described in the following detailed description, particularly when studied in conjunction with the drawings, wherein.

Figure 1:
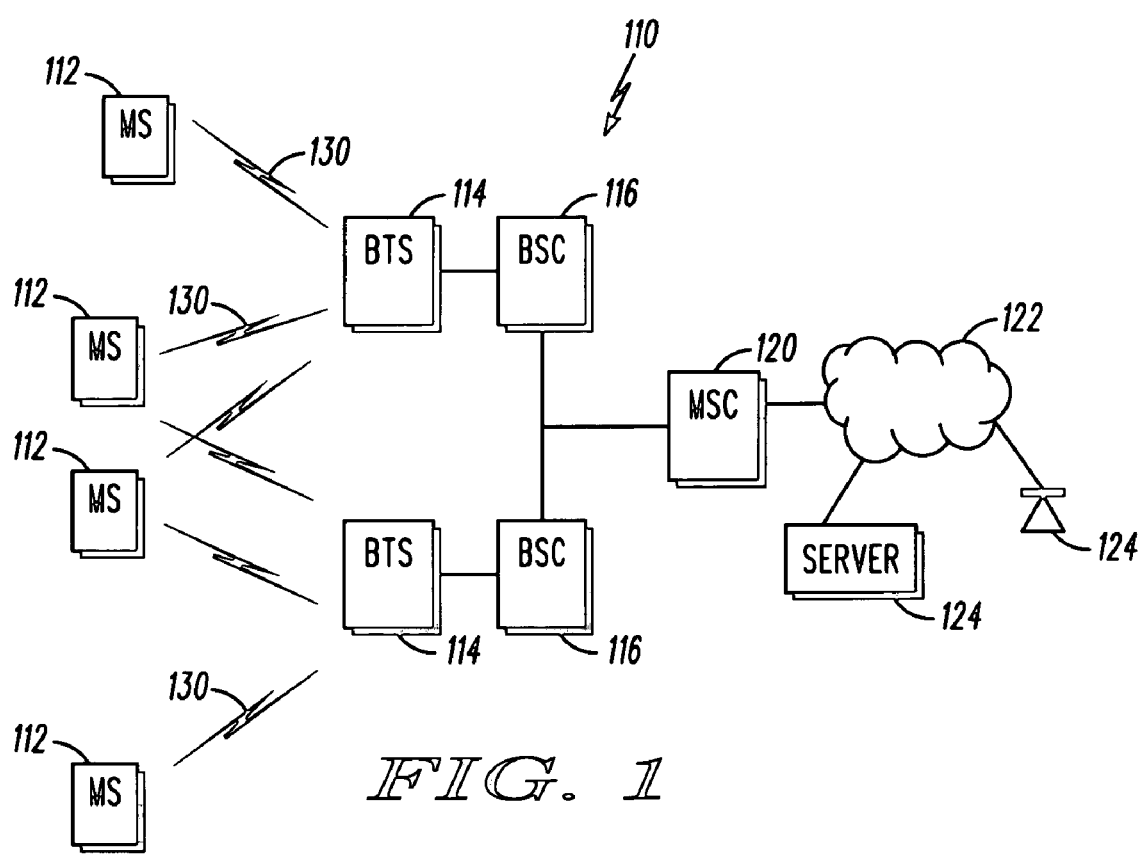
FIG. 1 depicts a simplified block diagram of a wireless communication network that provides wireless communications according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

These various embodiments provide for methods, systems and equipment or apparatuses that can be used to maximize system capacity, minimize transmit power requirements, optimize a received signal-to-noise ratio (SNR), and provide better optimized handoffs between beams. The present embodiments provide for the optimization of wireless beam synthesis by attempting to optimize and/or maximize the SNR that would be seen at the mobile. These embodiments measure reverse link signals to determine and generate a weighting that can be applied to one or more antennas in transmitting forward link signals. The weighting allows for enhanced handoff between beams. The better optimized transmit power further enhances the capacity of a wireless communication system and reduces interference at other non-intended wireless devices.

The present embodiments provide for a better optimized maintenance of wireless connections between a base station and wireless mobile devices or other sensitive devices in a switched-beam antenna forward link communication system. Further, these embodiments provide an enhanced transmission power distribution system that utilizes reverse link metrics and rules to distribute power on forward link beams. Some of these embodiments employ reverse link signal-strength, and/or signal-to-noise ratio (SNR) and/or signal-to-interference ratio (SIR) metrics to provide control over a plurality of forward link beams establishing communication between a base station and one or more wireless devices. Additionally, these embodiments can provide further optimized gain control of the communication beams.

The embodiments provide for optimal beam transmit weighting, in the sense of optimizing and/or maximizing the SNR and/or SIR as seen at the mobile, based in part on gain energies as determined from reverse-link communications from a mobile to a base station. These weighting can be determined for each mobile of a system such that the weighting can be different for each mobile. This optimal beam weighting can be applied for systems configurations using only the common pilot, the common pilot in combination with per-beam pilots, or the common pilot with per-user pilots, such that the given beam weightings better minimizes the transmit power required to achieve a given target SNR and/or SIR at the mobile. Some embodiments further maximize the capacity of a wireless communication system by using transmit beam weights for a given mobile that have been better optimized either separately for each sector, or jointly for all sectors of a given site. The present embodiments do not require additional antenna calibration to achieve the better optimized SNR. Further, some embodiments are implemented with existing hardware (e.g., existing application specific integrated circuits (ASIC)) with substantially no changes.

Methods, apparatuses and systems are provided for use in better optimizing switched beam, wireless communications. In some embodiments, a method is provided that receives a communication over at least a first reverse link beam and typically over a set of wireless reverse link beams, selects a rule in accordance with the pilot configuration of the system, and determines a weighting of one or more forward link beams according to the rule. The method can further determine and/or measure the energies of the set of reverse link beams, and as a function of these energies determine the appropriate weighting of the forward link beams. Some embodiments further select a type of beam weighting control, wherein the rule is determined according to the pilot beam configuration and the selected type of beam weighting.

Some embodiments provide a method for use in providing wireless communications. The method determines a pilot beam configuration for a wireless base transceiver station, receives a wireless communication through a set of reverse link beams, measures the energies received through the beams, and determines a transmit weighting for forward link beams in accordance with these energies.

The present embodiments further provide apparatuses for use in optimizing wireless communications. Some embodiments can include at least one antenna, a receiver coupled with the antenna, wherein the receiver receives wireless reverse link beams, a transmitter coupled with the antenna, wherein the transmitter transmits at least a first forward link beam, a pilot device coupled with a controller that implements a selected type of beam weighting, and the controller couples with the receiver and the transmitter, such that the controller employs one or more rules based, at least in part, on the pilot beam configuration and/or selected type of beam weighting, determines a forward link transmit weighting according to the set of measured reverse link energies for a given subscriber as applied to the rule, and directs the weightings to the at least one antenna for the transmission of the traffic signal to the given subscriber. The pilot device can further provide a pilot beam configuration, such that the controller determines the rules based at least in part on the pilot beam configuration and the measured reverse link energies. The apparatus can additionally include a calculator coupled with the controller, wherein the calculator calculates the weighting according to the reverse link energies and the rules; and a detector coupled with the antenna and the controller, wherein the detector determines a transmit gain of at least a first reverse link beam and forwards the gain to the controller.

FIG. 1 depicts a simplified block diagram of a wireless communication network 110, such as a frequency division duplex (FDD) network and other similar networks, that provides wireless communications according to some embodiments. The wireless communication can be achieved utilizing code division multiple access (CDMA) such as, IS-95 and 95B, CDMA2000, described in CDMA2000 International Telecommunication Union-Radiocommunication (ITU-R) Radio Transmission Technology (RTT) Candidate Submission document, which is incorporated herein by reference, CDMA1X, CDMA1xEV-DO and the like. However, in alternative embodiments the communication network 110 may utilize other digital cellular communication protocols such as, but not limited to, previous generations of CDMA, Cellular System Remote unit-Base Station Compatibility Standard of the Electronic Industry Association/Telecommunications Industry Association Interim Standard 2000 (IS2000), the next generation CDMA architectures, for example those described in the UMTS Wideband CDMA SMG2 UMTS Physical Layer Expert Group Tdoc SMG2 UMTS-L1 221/98 (UMTS 221/98), WCDMA, FDMA, the next generation Global System for Mobile Communications (GSM), the CDMA system as described in "Personal Station-Base Station Compatibility Requirements for 1.8 to 2.0 GHz Code Division Multiple Access (CDMA) Personal Communication System" (American National Standards Institute (ANSI J-STD-008)), or the European Telecommunications Standards Institute (ETSI) Wideband CDMA (W-CDMA), or other similar protocols.

Still referring to FIG. 1, the network 110 provides voice and/or data to be wirelessly communicated to and/or from one or more wireless devices 112 (e.g., mobile phones, wireless computers, personal digital assistant, data or messaging device, multi-media players, televisions, set-top-boxes, and the like). The network typically includes one or more base stations or base transceiver stations (BTS) 114 that include wireless transceivers for wirelessly communicating with the wireless devices 112. The wireless devices and BTSs provide for the coding, decoding, error checking and correction, frame type determination, power control, wireless transmission and reception and other similar functions.

The BTSs 114 typically couple with one or more base station controllers (BSC) 116 that can include selector distributor units, and/or mobile switching centers (MSC) 120. The MSCs can couple with a communication network 122, such as a public switched telephone network (PSTN), integrated services digital network (ISDN), the Internet, other MSCs, other networks and other components of the communication system 110. The communication network 122 can further couple with other networks.

The optimization of the transmit signals can be implemented within the BTSs 114, BSCs 116, the MSCs 120, the wireless devices 112 and/or other components within the network. Such functionality is probably best implemented with or in software programs and instructions and/or hardware (e.g., integrated circuits), application specific integrated circuits (ASIC) and the like), such as ASICs implemented in one or more of the wireless devices, BTSs, BSCs, MSCs or other devices of the system. Based on the present disclosure, one skilled in the art will be readily capable of producing and implementing such software and/or hardware without undo experimentation.

The wireless devices 112 can communicate with other wireless devices within the network 110, other wireless devices in other wireless systems (not shown), and other hard wired devices 124 (e.g., telephones, servers, computers, and the like). Typically, each wireless device communicates over a wireless link or channel 130. Further, wireless devices can in some instances simultaneously communicate with a plurality of BTSs. Communicating with a plurality of BTSs allows the system to take advantage of handoffs between BTSs to optimize the wireless signal quality and/or coverage for the network 110.

In some embodiments, the communication between the base station 114 and a mobile 112 is achieved through an FDD system where forward link transmission from the base station 114 to the mobile 112 is at one frequency and the reverse link transmission from the mobile to the base station is at a different frequency. The forward and reverse link channels are correlated over a length of time, but not in instantaneous or short terms. As a result, channels for the forward link from the BTS to the mobile are not assumed to be the same on the reverse link from the mobile to the BTS from an instantaneous point of view. The forward and reverse link channels are statistically related, but are generally not the same at a given time because of the frequency difference at which the two signals operate. Because of a reciprocity that exists between the forward and reverse links, the channels can be considered substantially equivalent when averaged over a period of time.

Figure 2:
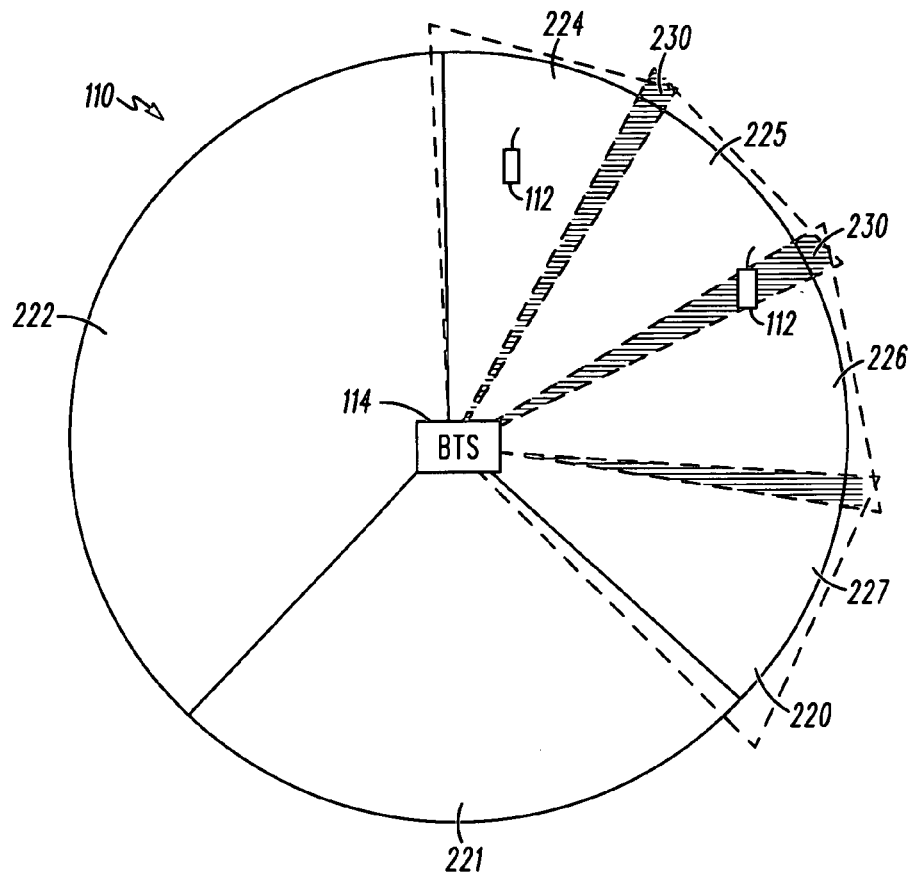
FIG. 2 depicts a simplified block diagram of a single cell of a communication network, such as the communication network of FIG. 1.

FIG. 2 depicts a simplified block diagram of a single cell 212 of a communication network, such as the communication network 110 of FIG. 1. The network 110 provides wireless communication between one or more BTSs 114 and wireless devices 112. Typically, at least some of these wireless devices are mobile devices that can roam within the cell and into other cells covered by other BTSs.

In some embodiments, cells 212 are divided into a plurality of sectors 220-222. For example, a cell can be divided into three, four or more sectors. Some cells can be subdivided into six or more sectors, but more typically are omni or three sector cells. Further, a finite set of communication beams or channels 224-227 can be established to provide the wireless communication over an entire sector. For example, three or four beams can be employed to provide wireless communication coverage for an entire sector. The sum of the areas covered by the beams 224-227 fully covers the sector 220. It is typically preferred that the beams are generated with a minimal amount of overlap 230 between beams.

Typically, in switched beam systems, the beams are directionally fixed. As a result, mobile devices are handed off from one beam to the next as the mobile devices travel around the BTS and other BTSs of a wireless communication network 110. A hard handoff occurs when a mobile receives and transmits communications only over a first link and then is switched to communicate only over a second link. This hard handoff does not provide sufficiently large region of overlap where the mobile can be reliably handed over from one transmit beam to the next, nor does it allow simultaneous transmission from multiple beams in instances in which the mobile is visible to both transmit beams (the mobile is in a beam overlap region or the channel has significant angular spread) and the SNR achievable at the subscriber per unit of transmit power is maximized by transmitting over both antennas. Hard handoffs between beams are typically undesirable because the hard handoffs can result in an increased number of dropped calls, and may reduce the overall system capacity relative to other handoff methods. Softer handoffs, which are mobile assisted in CDMA in the sense that the mobile measures the strength of the sector pilot signals and signals this information to the BTS, typically cannot be used for beam-to-beam handoffs, because the two beams typically share the same offset of the pseudorandom noise (PN) sequence generator. The present embodiments typically avoid a hard hand-off from one beam to another as a mobile travels from a first beam's coverage to a second beam's coverage.

In a switched beam system, one of the objectives of a BTS 114 is to use the beams to minimize the transmit power required to achieve the target forward link SIR and/or SNR at the mobile. Let $f_1$, $f_2$, and $f_3$ denote vector multi-path channels over first, second and third beams, respectively (e.g., beams 225, 226 and 227 of FIG. 2). A vector channel typically consists of some small number of multi-path components (e.g., one, two, three, etc.), and the energy $\|f_i\|^2$ of the channel is given by the sum of the energies of the components, such that the energy can be defined by:

$$\|f_i\|^2 = \sum_j |f_{i,j}|^2,$$

where j is defined as the individual paths of the channel. It is noted that this definition for the channel energy reflects the effects of shadowing and fading, as well as the separate antenna gains between beams and the mobile.

In some communication systems and/or protocols, such as an FDD system, the forward and reverse link channels are typically not equal in an instantaneous sense. However, due to reciprocity, the forward and reverse link channels are substantially equal in a long-term average sense (e.g., 0.25 seconds, 0.5 seconds, 1.0 seconds, or other periods of time providing an accurate average), where the meaning of long-term depends on parameters such as the mobile velocity and the carrier frequency used by the system. The present embodiments take advantage of this fact to make measurements over the reverse link that can be used to determine the beam weightings that should be applied on the forward link for a particular mobile and/or mobiles.

Further, these embodiments typically take some average of the reverse channel measurements over an appropriate time interval before being used for this purpose (e.g., 0.5 seconds, 0.75 seconds and other appropriate time intervals depending on one or more system characteristics/parameters, such as the environment, the carrier frequency used by the system, the velocity of the mobile and/or other similar factors). In some embodiments, if the velocity of the mobile (the radial projection of the mobile's velocity relative to the BTS) is known, the averaging interval for a particular mobile can be chosen in accordance with the velocity of the mobile and the frequency of the communication band. If, as is more typical, a given mobile's velocity is not known by the BTS, a common averaging interval of appropriate duration can be employed for the reverse link measurements of all mobiles in communication with the BTS.

As discussed above, switched beam systems typically employ multiple beams 224-227 per sector 220, and one or more of these beams can be utilized to establish communication between the BTS and the mobile. In switched beam systems, wireless communication signals directed to a target mobile can be transmitted with equal power over multiple beams, or a separate transmit gain can be applied to each beam. In present embodiments, the BTS attempts to employ the beams to better minimize the transmit power while still achieving a target forward link frame error rate (FER) and/or SNR at the mobile.

The optimal use of the multiple beams typically depends on both the communication standard employed (e.g., IS-95, CDMA2000, 1x-EVDV, 1x-EVDO, WCDMA and other similar communication standards) and the implementation of the standards. Further, the optimal use of the beams can further depend on how the pilot signals are configured in a system. Typical pilot beam configurations can include: common pilots with the pilot signal being transmitted over all of the beams 224-227 (at least in a sector) and at the same gain, the use of the common pilot in combination with per-beam pilots where separate and distinguishable pilot signals are typically communicated over a single beam with a defined gain and directed to any mobile or other device capable of receiving the beam, or the common pilot in combination with per-user pilot signals where a separate pilot signal is assigned to each mobile and the same beam weightings are used for both the traffic channel and the per-user pilot assigned to a given mobile.

The present embodiments attempt to optimize metrics, such as SNR, SIR, FER and other metrics, utilizing switched beam wireless communication systems. Further, these embodiments can provide optimization of the metrics for common pilot systems, per-beam pilot systems, as well as per-user pilot systems. Some embodiments provide rules for assigning beam transmit gains for implementations in which the beam gains can be set individually and/or variably, while some embodiments establish rules for turning beams on and off for implementations in which beam gains are to be equal for all beams used to transmit to the mobile. The rules provided for both types of beam weighting embodiments, with variable control of the beam gains (such that each beam can have a different weighting) and ON/OFF control (such that a beam is on or off, and typically, all beams that are on have the same gain), and address different types of pilot configurations including systems with the common pilot only, the common pilot in combination with per beam pilots, and the common pilot in combination with per user pilots.

Prior softer handoff systems and their implementation of softer handoffs between sectors of the same BTS are generally understood in the art. Typically, a softer handoff is implemented in a mobile-assisted fashion using pilot strength measurements taken by the mobile and transmitted to the BTS. With softer handoffs, all sectors that are transmitting the traffic signal to a particular mobile typically transmit with the same power allocation. The mobile knows or recognizes if a sector is transmitting a signal intended for the mobile, and the mobile combines the signal from a particular BTS sector only if that sector is transmitting to the mobile.

Alternatively, beam-to-beam handoffs are implemented through different methods. In common pilot systems, a mobile is not aware which beams within a sector are being used to transmit to the mobile, and the mobile typically cannot separate and identify the signals from the different beams. Thus, a mobile combines the signal contributions from all beams that can be detected by Walsh despreading the pilot, or other similar methods.

The above limitations on a switched beam system demonstrate some of the handoff problems for a switched beam system. Further, it is clear that the problems for handoffs in a switched beam system are different than the softer handoff problem. With consideration of the limitations imposed by the user of switched beams, the present embodiments identify and provide for the implementation of optimizing thresholds for turning beams on and off, and also identifies and implements rules for determining and implementing better optimized transmit weightings that can be applied to these beams.

The present embodiments attempt to better optimize communication to and from mobile devices. The optimization can include minimizing dropped calls. Some embodiments implement a make-before-break rule used for beam-to-beam handoff. In handing off a mobile from a first beam to a second beam, this rule provides that at least the first beam alone transmits to mobile, followed by transmission to the mobile through both the first and second beams, after which the mobile is handed over to the second beam so that the second beam alone transmits to mobile. Typically, the first beam continues to provide communication until the strength of the signal received from the mobile on the second beam divided by the strength received on the first beam falls below a predefined threshold.

The implementation of the handoff between beams is further dependent upon the type of system and the communication protocol. For example, in systems that utilize IS-95A and/or B mobiles, the beams in the same sector are typically required to use the same Walsh code to transmit to the mobile. Conversely, if a per-beam system (with auxiliary pilots) is used with CDMA2000 mobiles, either the same or different Walsh codes can be used by beams in the same sector to transmit to the mobile. Additionally, the optimization of different beam power allocations is dependent on whether or not common pilots, per-beam pilots, and/or per-user pilots are supported at the BTS and/or through the mobile.

Present embodiments define the relative optimal power allocation between beams of a single sector and/or beams of multiple sectors. These embodiments can provide better optimization and/or maximization of the wireless communication for common pilot systems, per-beam pilot systems, per-user pilot systems, as well as systems where ON/OFF thresholds for turning on/off beams with equal transmit gains is utilized, and systems where better optimized transmit gains are provided when unequal transmit gains can be utilized.

In providing the beam weighting optimization and/or maximization, the embodiments typically define which beams are to be activated or turned on. These embodiments further determine gains that are to be assigned to particular traffic channels on the different beams based on measurements of the power received on beams over reverse links. The BTS measures the power received on each of the reverse link beams, and the measurements for each beam are typically averaged over an appropriate time constant. Further, the weighting is preferably determined individually for each mobile to better optimize wireless communication for each mobile.

The present embodiments better minimize the transmit power required to achieve a target forward link SNR and/or FER at the mobile. For simplicity, the initial discussions below assume the use of only two beams for communicating with the mobile. However, the inventive aspects of the present embodiments can readily be extended to an arbitrary number of beams as described below.

For simplicity, the following analysis assumes that the mobile of interest is in an environment with low geometry where other or external cell interference dominates over intra-cell interference.

Let $f_i$ denote the vector multipath channel between the base station and the wireless device (e.g., mobile 112) for the i-th beam (e.g. beam 224), as seen at the wireless device. The vector channel consists of some small number of multipath components (typically, one, two or three), and the energy of the channel is given by the sum of the energies of the components, so that $$\|f_i\|^2 = \sum_j |f_{i,j}|^2.$$

Note that the channel reflects the effects of shadowing and fading, as well as the separate antenna gains between beams and the mobile. In some systems, such as with frequency division duplex (FDD) system, the forward and reverse link gain energies are typically not equal in an instantaneous sense. However, due to reciprocity, the forward and reverse link gain energies are considered substantially equal in a long-term average sense (e.g., 0.25 seconds, 0.5 seconds, 1.0 seconds, or other periods of time providing an accurate average). Thus, present embodiments advantageously utilize measurements made on the reverse link to determine beam control and/or weightings that should be applied for forward link communications directed to an intended wireless device or devices.

I) Common Pilot Only System

A) Equal Beam Gains:

Some embodiments are employed in pilot beam configurations where the common pilot assigned to the sector is transmitted from each beams 224-227 of the sector 220 (see FIG. 2). In this embodiment, the beam gains for the traffic channel assigned to a given mobile are equal for all the beams that are "ON" in the sense that they are transmitting the traffic channel with non-zero gain. As such, the BTS controls the beams by turning ON one or more beams. In this initial discussion, it is assumed that either the sector is only subdivided into two beams, or that at most two beams from any given sector are visible to the mobile in the sense that the energy of the signal received by the mobiles from these beams is substantially non-zero.

In a common pilot system in which only two beams are visible to the mobile and only a one of these two beams is actively used to transmit to the mobile, the signal-to-noise ratio (SNR) for a mobile receiver is proportional to:

$$SNR = \frac{(\|f_i\|^2)^2}{\|f_1\|^2 + \|f_2\|^2}, \quad \text{Eq. 1}$$

where i=1, 2, and such (in this and the following equations, a common constant of proportionality has been dropped from the equations; furthermore, the above is a low geometry approximation of the SNR which ignores multipath interference and is most accurate when other-cell interference dominates intra-cell interference). Alternatively, if the system is transmitting the traffic channel over both beams and this same power is divided equally over the two beams, the SNR is found to be proportional to:

$$SNR = \frac{\frac{1}{2}(\|f_1\|^2 + \|f_2\|^2)^2}{\|f_1\|^2 + \|f_2\|^2}. \quad \text{Eq. 2}$$

Thus, both the first and the second beams should be turned on at the same time whenever:

$$\frac{\frac{1}{2}(\|f_1\|^2 + \|f_2\|^2)^2}{\|f_1\|^2 + \|f_2\|^2} > \max\left\{\frac{(\|f_i\|^2)^2}{\|f_1\|^2 + \|f_2\|^2}, i \in \{1, 2\}\right\}. \quad \text{Eq. 3}$$

Based at least in part on Equation 3, and with a gain energy ratio $\alpha$ defined by:

$$\alpha = \|f_2\|^2 / \|f_1\|^2, \quad \text{Eq. 4}$$

the inventors have discovered that the SNR at the mobile can be maximized by activating the beams according to the following rule:

$$\text{If } \alpha \begin{cases} < \sqrt{2} - 1 & \text{Beam 1 only} \\ > (\sqrt{2} - 1)^{-1} & \text{Beam 2 only} \\ \text{else} & \text{Both beams} \end{cases} \quad \text{Rule 1}$$

When Rule 1 is applied, the present invention provides a resulting SNR at the mobile given by:

$$\text{If } \alpha \begin{cases} < \sqrt{2} - 1 & \text{Beam 1 only} & SNR = \|f_1\|^2/(1+\alpha) \\ > (\sqrt{2} - 1)^{-1} & \text{Beam 2 only} & SNR = \|f_2\|^2/(1+\alpha^{-1}) \\ \text{else} & \text{Both beams} & SNR = \|f_1\|^2(1+\alpha)/2 \end{cases}$$

It is noted that this beam control rule provides an overlap region where both beams are active before there is a transition to only a single beam. This is consistent with the desired make-before-break rule for beam handoff and maintains communication with the mobile.

Additionally, if the sum energy of the two channels is normalized such that:

$$\|f_1\|^2+\|f_2\|^2=1,$$

the SNR can be calculated according to Rule 1 above as being defined as:

$$SNR = \begin{cases} (1+\alpha)^{-2} & \alpha < \sqrt{2}-1 \\ (1+\alpha^{-1})^{-2} & \alpha > (\sqrt{2}-1)^{-1} \\ 1/2 & \text{else} \end{cases}$$

In situations where the mobile of interest is in an environment with high geometry where intra-cell interference dominates over other or external cell interference, the inventors determined that Rule 1 still applies and is again given by:

$$\text{If } \alpha \begin{cases} < \sqrt{2}-1 & \text{Beam 1 only} \\ > (\sqrt{2}-1)^{-1} & \text{Beam 2 only} \\ \text{else} & \text{Both beams} \end{cases}$$

The SNR achieved at the mobile when Rule 1 is being applied in a high geometry condition is given by the following:

$$SNR = \begin{cases} \alpha^{-1}/2 & \alpha < \sqrt{2}-1 \\ \alpha/2 & \alpha > (\sqrt{2}-1)^{-1} \\ (\alpha+\alpha^{-1})^2/4 & \text{else} \end{cases}$$

The beam weighting provided by the present embodiments can additionally be extended to situations in which the sector is partitioned into three beams, or alternatively, in which a total of three beams (possibly from several sectors) are visible to the mobile. In some embodiments, the beams are identified and labeled according to reverse link gain. A reverse link beam with the greatest gain energy $\|f_i\|^2$ is defined as a first beam $b_1$ with a gain energy of $\|f_1\|^2$, the reverse link with the second greatest gain energy is defined as a second beam $b_2$ with gain energy of $\|f_2\|^2$, and a third beam $b_3$ has a gain energy of $\|f_3\|^2$. Therefore, the present embodiments define and/or label the beams such that:

$$\|f_1\|^2 \geq \|f_2\|^2 \geq \|f_3\|^2. \qquad \text{Eq. 5}$$

If the inequality does not hold for the initial or default beam labeling, the beam labels can be reassigned so that the strongest beam is labeled $b_1$, the next strongest beam is labeled $b_2$, and the weakest beam is labeled $b_3$.

A first gain energy ratio $\alpha_1$ is defined according to Equation 4 above so that:

$$\alpha_1 = \|f_2\|^2/\|f_1\|^2.$$

A second gain energy ratio $\alpha_2$ is defined as:

$$\alpha_2 = \|f_3\|^2/\|f_1\|^2. \qquad \text{Eq. 6}$$

Based on the above defined parameters, the inventors determined that the SNR can be maximized according to the following:

$$\text{If} \begin{cases} \|f_1\|^2 \geq \max\left\{\frac{1}{\sqrt{2}}(\|f_1\|^2+\|f_2\|^2), \frac{1}{\sqrt{3}}(\|f_1\|^2+\|f_2\|^2+\|f_3\|^2)\right\} & \text{beam } b_1 \text{ only} \\ \frac{1}{\sqrt{2}}(\|f_1\|^2+\|f_2\|^2) \geq \max\left\{\|f_1\|^2, \frac{1}{\sqrt{3}}(\|f_1\|^2+\|f_2\|^2+\|f_3\|^2)\right\} & \text{beams } b_1 \text{ and } b_2 \text{ only} \\ \frac{1}{\sqrt{3}}(\|f_1\|^2+\|f_2\|^2+\|f_3\|^2) \geq \max\left\{\|f_1\|^2, \frac{1}{\sqrt{2}}(\|f_1\|^2+\|f_2\|^2)\right\} & \text{beams } b_1, b_2 \text{ and } b_3 \end{cases} \qquad \text{Rule 2a}$$

The maximization of the SNR defined by Rule 2a can be further simplified according to the first and second gain energy ratios, such that:

$$\text{If} \begin{cases} \alpha_1 \leq \sqrt{2}-1 (\approx 0.41) \text{ and } \alpha_2 \leq \sqrt{3}-1-\alpha_1 (\approx 0.73-\alpha_1) & \text{beam } b_1 \text{ only} \\ \alpha_1 \leq \sqrt{2}-1 (\approx 0.41) \text{ and } \alpha_2 \leq (1+\alpha_1)/2 + \sqrt{6} & \text{beams } b_1 \text{ and } b_2 \text{ only} \\ \text{else} & \text{beams } b_1, b_2 \text{ and } b_3 \end{cases} \qquad \text{Rule 2b}$$

Figure 3:
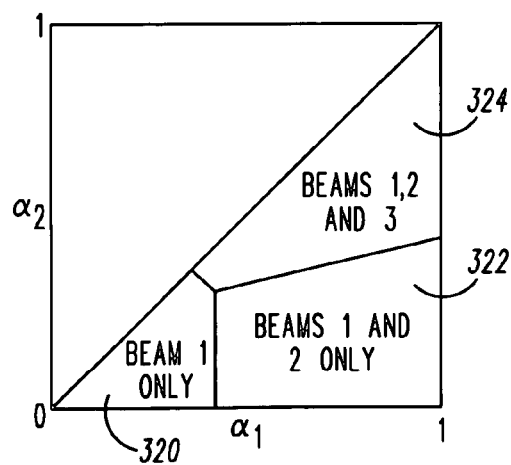
FIG. 3 depicts a simplified graphical representation of the application of rules providing better optimized weighting according to some embodiments.

As a result, the first beam $b_1$ (i.e., the beam with the greatest gain energy) is substantially always utilized to communicate with the mobile, and the decision whether or not to turn ON the second and/or third beams, $b_2$ and $b_3$, depends on which of the above inequalities is satisfied according to Rule 2b. FIG. 3 depicts a simplified graphical representation of the application of Rule 2b according to some embodiments. Again, the first beam $b_1$ is only applied 320 when $\alpha_1 \leq \sqrt{2}-1$ and $\alpha_2 \leq \sqrt{3}-1-\alpha_1$, the first and second beams $b_1$ and $b_2$ are only applied 322 when $\alpha_1 \geq \sqrt{2}-1$ and $\alpha_2 \leq (1+\alpha_1)/2+\sqrt{6}$, and all three beams are applied 324 otherwise.

As the number of beams under consideration increases beyond three, the simplified generalization rules become increasingly more complex. Such situations arise when either the number of beams per sector is increased beyond three, and/or when the beams from multiple sectors, and possibly sites, are considered jointly in the beam selection process. Because of the increased complexity and potential computational requirements and overhead in determining the better optimized weighting for more than three beams, some embodiments extend the above defined rules to more than three beams by sorting the beams under consideration by channel strength, and apply either the two beam Rule 1 to the strongest two beams, or the three beam Rule 2b to the strongest three beams.

Further, the number of beams under consideration is determined based on the number of reverse link beams carrying communications from a wireless device. In some embodiments, the signal received on the reverse link of the beam have to satisfy predefined criteria with respect to signal strength, SNR, SIR, FEC, and/or other predefined criteria, such as the assignment of one or more fingers, before the beams is considered as a viable beam to be considered for forward link transmission.

Figure 4:
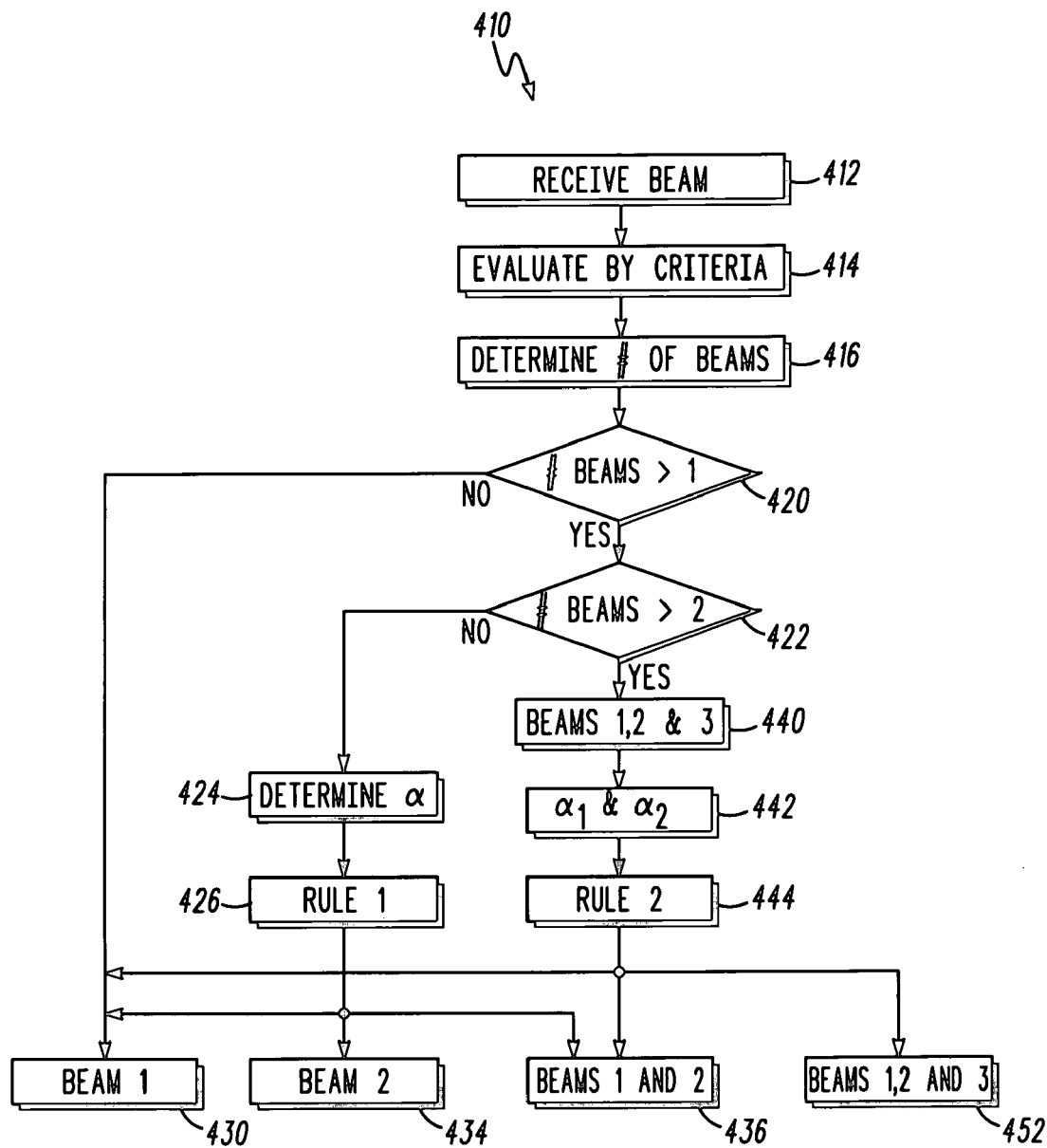
FIG. 4 depicts a simplified flow diagram of a process for use in and applying an equal gain weighting in the generation of forward link beams to establish wireless communication.

FIG. 4 depicts a simplified flow diagram of a process 410 for use in and applying weighting in the generation of forward link beams to establish wireless communication. In step 412, one or more reverse link beams are received. In step 414, the received beam(s) are evaluated according to predefined criteria. For example, the received signal strength is measured and other similar parameters are evaluated for the received beams. In step 416, the process determines and/or detects the number of beams received over reverse links from a single wireless device (e.g., a wireless mobile device) that satisfy the predefined criteria.

In step 420, it is determined if the number of beams exceeds one beam. If there is only one received beam the process proceeds to step 430. In step 430, the weighting for a forward link beam is defined as ON. If it is determined in step 420 that the number of candidate beams is greater than one, step 422 is entered where it is determined if the number of candidate beams exceeds two beams. If only two beams satisfy the predefined criteria, the process continues to step 424. In step 424, a first gain energy ratio $\alpha_1$ is determined according to the ratio of the gain energies of the first and second received beams as defined by Equation 4.

In step 426, the process applies Rule 1 as defined above comparing the first gain energy ratio to thresholds (e.g., ($\sqrt{2}-1$) and ($\sqrt{2}-1$)$^{-1}$). If it is determined when applying Rule 1 that the gain ratio is less than a first threshold, step 430 is entered where the process defines a first beam as the only active beam and the first beam is defined as ON. If the gain ratio is greater than both the first threshold and a second threshold step 434 is entered where the process defines a second beam as the only active beam and the second beam is defined as ON. If the gain is not greater than the second threshold, the process continues to step 436 where both the first and second beams are designated as active, both are set to an ON state and both are defined with an equal weighting.

Returning to step 422, if the number of beams does exceed two beams, the process continues to step 440 where the three beams with the greatest signal strength and/or energy are determined, and the beam with the greatest energy gain is defined as a first beam $b_1$, the beam with the second greatest energy gain is defined as a second beam $b_2$ and the beam with the third greatest energy gain is defined as a third beam $b_3$. In step 442, a first gain energy ratio $\alpha_1$ is determined according to the ratio of the gain energies of the first beam $b_1$ and the second beam $b_2$, as defined by Equation 4, and a second energy ratio $\alpha_2$ is determined according to the ratio of the gain energies of the first beam $b_1$ and the third beam $b_3$, as defined by Equation 6.

In step 444, the process 410 applies Rule 2 as defined above using the first and second gain ratios. For example, in applying Rule 2, a first condition is evaluated to determined if the first gain energy ratio $\alpha_1$ is less than or equal to a first threshold (e.g., ($\sqrt{2}-1$)) and the second gain ratio $\alpha_2$ is less than or equal to a second threshold (e.g., ($\sqrt{2}-1-\alpha_1$)). If the conditions for the first and second gain ratios are met the process proceeds to step 430 where the first beam $b_1$ designated as the only active beam and the first beam is defined as ON. If the first condition fails, Rule 2 is further applied to evaluate a second condition to determine if the first gain ratio meets a third threshold, (e.g., $\geq(\sqrt{2}-1)$) and if the second gain ratio meets a fourth threshold (e.g., $\leq(1+\alpha_1)/(2+\sqrt{6})$). If the conditions are met, the process proceeds to step 436 where both the first and second beams are designated as active, both are set to an ON state and both are defined with an equal weighting. If the second condition is not met, the process continues to step 452 where the first, second and third beams are designated as active, set to an ON state and all three are assigned equal weighting. When a base station is communicating with a plurality of mobiles, the process 410 is typically implemented independently for each of the mobiles to provide better optimized weighting for each of the mobiles.

ON/OFF beam switching can have an impact on overall power control and received power levels at a mobile. Some embodiments scale up the power of remaining beams still communicating with a mobile of interest when one or more beams are removed or powered down. Additionally, some embodiments use the same power for the new beam being activated as for the beams currently in use when a beam is added. Alternatively and/or additionally, the weighting of beams can include adjustments to one or more beams as beams are turned on or off. For example, as beams are turned on and off, the power of the other beams can be scaled so that the total transmitted power is the same as immediately prior to the change. Once the selected beam is powered on or off, the power level of the remaining beams can then be adjusted to meet system and mobile needs to maintain accurate communication. In some embodiments hysterisis is employed to reduce the frequency at which the set of beams used to transmit to a given mobile is changed, and to prevent beams from being turning on and off too frequently. With hysterisis, the rules defined (e.g., Rules 1 and 2, as well as the rules defined below) can be implemented with boundaries between the different beam selection regions that depend on which region is currently being utilized to transmit. Typically, the boundaries defined by Rules 1 and 2 and illustrated in FIG. 3 are modified to increase the size of the current region of operation for the given mobile, so as to reduce the frequency at which the mobile shifts between different beam assignment regions.

B) Variable Controlled Beam Gains for Two Beams:

The signal-to-noise ratio at the mobile can be improved with common pilot systems if the type of beam weighting selected provides for variable control so that the beam gains can be variably controlled. In an instance where two beams are visible to the mobile and/or just the two beams with the greatest gain energies are considered for transmission of the traffic signal, a beam gain applied for a second beam is defined, for example as $\sqrt{\beta}$, and a beam gain for a first beam is similarly defined as $\sqrt{1-\beta}$, for $0 \leq \beta \leq 1$. The sum of the energies of the two beams is equal to:

$$(\sqrt{\beta})^2 + (\sqrt{1-\beta})^2 = 1. \qquad \text{Eq. 7}$$

As such, the transmitted power is independent of gain $\beta$. Further, the signal-to-noise ratio at the mobile was determined to be proportional to:

$$SNR = \frac{\left((1-\beta)^{\frac{1}{2}}\|f_1\|^2 + \beta^{\frac{1}{2}}\|f_2\|^2\right)^2}{\|f_1\|^2 + \|f_2\|^2} = \frac{\left((1-\beta)^{\frac{1}{2}} + \alpha\beta^{\frac{1}{2}}\right)^2 \|f_1\|^2}{1+\alpha}, \qquad \text{Eq. 8}$$

where $\alpha$ is still assumed to be the gain ratio $\|f_2\|^2/\|f_1\|^2$ as defined above in Equation 4.

Based on Equation 7 and the SNR expression of Equation 8, the inventors determined that the signal-to-noise ratio at the mobile, when operating under low geometry conditions, can be maximized when:

$$\beta = \frac{\alpha^2}{1+\alpha^2}. \qquad \text{Rule 3}$$

Further, the signal-to-noise ratio that results when applying the rule as defined above by Rule 3 is given by:

$$SNR = \frac{(1+\alpha^2)\|f_1\|^2}{1+\alpha} = \frac{(1+\alpha^2)\|f_2\|^2}{1+\alpha^{-1}}. \qquad \text{Eq. 9}$$

If the sum energy of the two channels is normalized so that:

$$\|f_1\|^2 + \|f_2\|^2 = 1,$$

the signal-to-noise ratio resulting through the application of Rule 3 is proportional to:

$$SNR \propto \frac{1+\alpha^2}{(1+\alpha)^2}. \qquad \text{Eq. 10}$$

In comparing the resulting maximized SNR according to Rule 1 for a common pilot system utilizing equal beam gains applied with that of the maximized SNR according to Rule 3 for a common pilot system utilizing variable control of beam gains, it is observed that:

$$\frac{1+\alpha^2}{(1+\alpha)^2} \geq \max\left\{\frac{1}{(1+\alpha)^2}, \frac{1}{2}, \frac{1}{(1+\alpha^{-2})^2}\right\}. \qquad \text{Eq. 11}$$

Thus, as expected, the signal-to-noise ratio as seen at the mobile is at least equal to and often better when individually optimized weighting of the beams is applied as compared with systems where equal gains are applied when beams are active.

In situations where the mobile of interest is in an environment with high geometry, it can readily be shown that Rule 3 still applies and results in a SNR at the mobile proportional to:

$$SNR = \frac{\alpha^{-2} + \alpha^2}{2} \qquad \text{Eq. 12}$$

$$SNR \propto \frac{\alpha^{-2} + \alpha^2}{2}.$$

Variable Control of Beam Weighting of Three or More Beams

In determining beam weighting for three or more signals when the weightings can be variably controlled and thus, in general, unequal, the first and second energy ratios for three beams can be defined according to Equations 4 and 6 above, so that $$\alpha_1 = \|f_2\|^2/\|f_1\|^2 \text{ and } \alpha_2 = \|f_3\|^2/\|f_1\|^2.$$

This can similarly be extended to additional beams. Unlike the previous discussion of ON/OFF weighting of the beams, embodiments providing variable beam weighting for three or more beams do not require that the beams be identified and/or labeled according to signal strength. With the above definitions, the optimal power weightings for the beams, for example three beams $b_1$, $b_2$, and $b_3$, are defined by the sequence given by:

$$\left\{\frac{1}{1+\alpha_1^2+\alpha_2^2}, \frac{\alpha_1^2}{1+\alpha_1^2+\alpha_2^2}, \frac{\alpha_2^2}{1+\alpha_1^2+\alpha_2^2}\right\}. \qquad \text{Rule 4a}$$

Having defined the weighting for the three beams, the optimal amplitude weightings of the beams was determined to be proportional to the sequence given by:

$$\left\{\sqrt{\frac{1}{1+\alpha_1^2+\alpha_2^2}}, \sqrt{\frac{\alpha_1^2}{1+\alpha_1^2+\alpha_2^2}}, \sqrt{\frac{\alpha_2^2}{1+\alpha_1^2+\alpha_2^2}}\right\}. \qquad \text{Rule 4b}$$

From the results above for three beams and the previous result for two beams, the inventors further determined that the optimal power weightings for some arbitrary number N of beams is given by:

$$\left\{\frac{1}{1+\alpha_1^2+\ldots+\alpha_{N-1}^2},\right. \qquad \text{Rule 5a}$$

-continued
$$\left\{\sqrt{\frac{\alpha_1^2}{1+\alpha_1^2+\ldots+\alpha_{N-1}^2}},\ldots,\sqrt{\frac{\alpha_{N-1}^2}{1+\alpha_1^2+\ldots+\alpha_{N-1}^2}}\right\},$$

while the optimal amplitude weighting is given by the sequence:

$$\left\{\sqrt{\frac{1}{1+\alpha_1^2+\ldots+\alpha_{N-1}^2}},\right.$$ Rule 5b
$$\left.\sqrt{\frac{\alpha_1^2}{1+\alpha_1^2+\ldots+\alpha_{N-1}^2}},\ldots,\sqrt{\frac{\alpha_{N-1}^2}{1+\alpha_1^2+\ldots+\alpha_{N-1}^2}}\right\}.$$

Weighting Across Multiple Sectors and Sites/Cells

The above description demonstrated the optimizing control of variable beam weighting for an arbitrary number of beams. Some embodiments implement this beam optimization across multiple sectors and/or multiple sites (e.g., multiple BTSs within a single cell and/or different cells). Some embodiments alternatively limit the optimization of beam weighting to beams within a single site. This is because the communication requirements for determining better optimized weighting across multiple sites may be difficult and/or infeasible due to the amount of communication needed between sites. However, some embodiments can establish and provide the communication between sites, either through direct coupling, remote coupling (e.g., through a network, an intranet, the Internet and the like) and/or wirelessly (e.g., wireless between BTSs and/or relayed through one or more wireless devices).

For those embodiments that limit the optimization to a site, the optimization can be implemented to provide the optimization of beam weighting within each sector, with each sector weighting optimized separately, and/or the optimization of beam weighting within each site (since a site incorporates multiple sectors), with each site weighting optimized separately. While it may initially seem apparent that the performance of per site optimization would be superior to per sector optimization, the inventors of the present embodiments have determined that this is not an accurate assumption, at least for some of the implementations. Alternatively, the present embodiments are typically implemented to provide per sector optimization which typically provide better weighting optimization than achieved through per site optimization.

The reason for this apparent anomaly seems to be that there are not enough fingers in the mobile to demodulate all multi-paths, and the finger assignment algorithm in a mobile assigns fingers not just on the strength of a multi-path, but also to achieve sector and site diversity. Thus, a weak path may have a finger assigned while a stronger path does not, if the strong path is associated with a sector that has already been assigned a finger. The fact that fingers are not assigned purely on the basis of path strength seems to favor per sector optimization of the beam weights over per site optimization.

As a result, the present embodiments typically utilize the above defined rules (e.g., Rules 1-5) according to per sector optimization. This can additionally reduce the computational overhead and the communication requirements between sites.

It is noted that the rules for variable beam weighting control were defined such that the squares of the transmit beam coefficients sum to unity for a given mobile. For per sector optimization, embodiments are typically configured such that the squares of the beam coefficients in each sector sum to unity. Similarly for per site optimization, the squares of the beam coefficients attached to the site can sum to unity.

Some embodiments are further employed such that power control is provided on top of the beam weighting that provides better optimized SNR at the mobile. For example, some embodiments multiply the beam weights in a sector by a common gain factor that is adjusted by the forward link power control commands, for example power commands received from the mobile. Because the sum of the beam powers has been normalized to unity, either per sector or per site, the operation of switched beams with variable control of the beam weights is approximately neutral with respect to power control, and can operate independently of power control.

Figure 5:
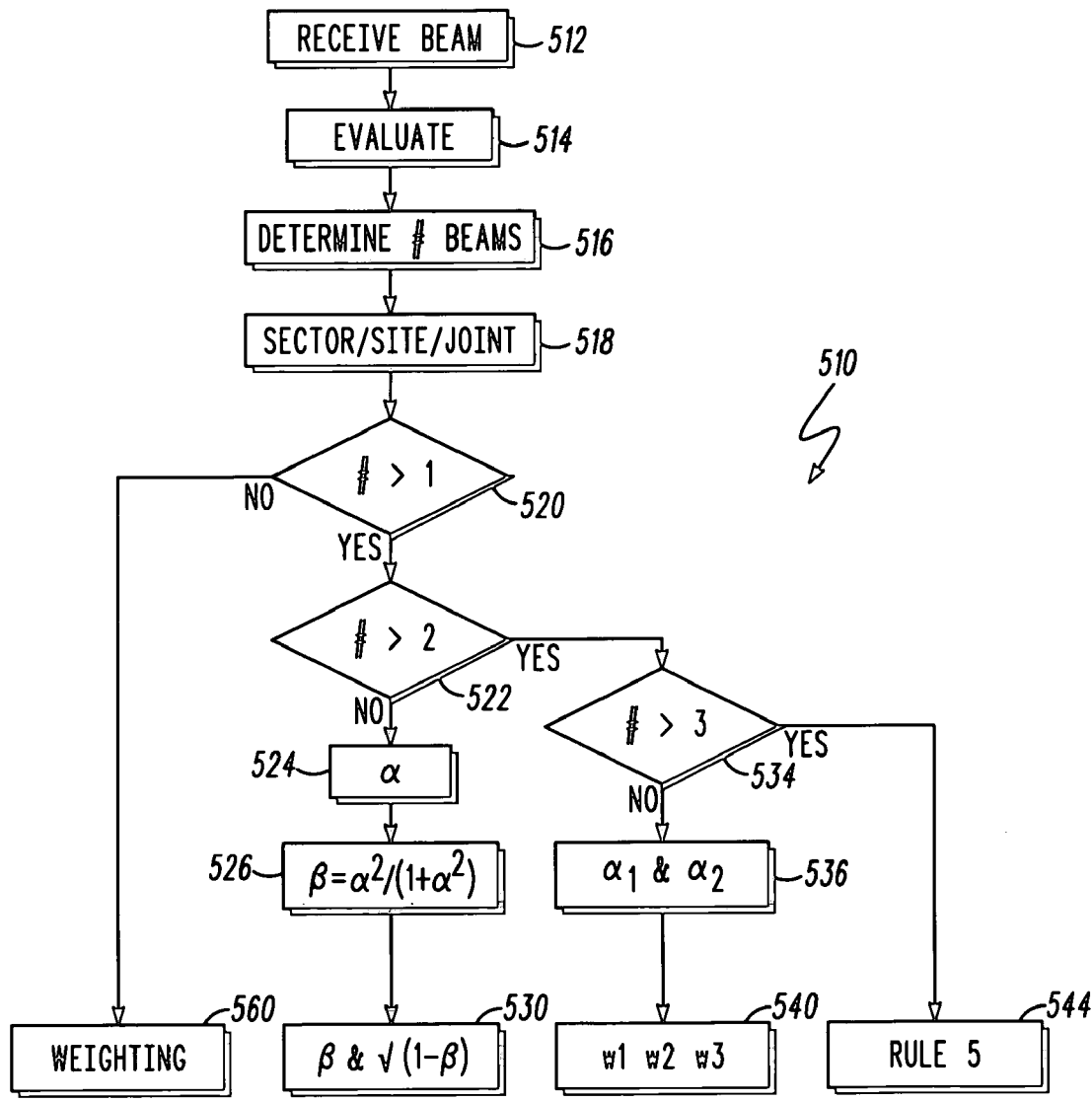
FIG. 5 depicts a simplified flow diagram of a process for use in and applying weighting in the generation of forward link beams to establish wireless communication for common pilot systems providing individual weighting of beams.

FIG. 5 depicts a simplified flow diagram of a process 510 for use in and applying weighting in the generation of forward link beams to establish wireless communication for common pilot systems providing variable weighting of beams. In step 512, one or more beams are received over one or more reverse links from a given mobile. In step 514, the received beam(s) are evaluated according to predefined criteria. In step 516, the process determines and/or detects the number of beams received that satisfy the predefined criteria for the given mobile.

In step 518, a sector, site and/or joint optimization type can be selected and/or determined, and beam partitioning is defined for the remainder of the process 510. Some embodiments utilize sector optimization, where beam weights can be optimized independently for each sector, and the beams for each sector can be considered jointly. In utilizing site optimization, the beam weights can be optimized independently for each site, and the beams from each site can be considered jointly. In some embodiments, it is preferred to optimize all of the beam weights jointly, and as such, the beams are not partitioned by sector or site for the purpose of assigning weights. In step 520, it is determined if the number of beams exceeds one beam. If there is only one received beam the process proceeds to step 560 where the weighting for the forward link of the one beam is defined as ON based on Rule 3 and $\sqrt{1-\beta}$ with $\beta=0$ (no second signal). If there is more than one beam, step 522 is entered where it is determined if the number of beams exceeds two beams. If there are only two beams step 524 is entered where a first gain energy ratio $\alpha$ is determined (Equation 4). In step 526, a gain factor $\beta$ is determined according to Rule 3. In step 530, a weighting for the first and second beams is determined according to $\sqrt{1-\beta}$ and $\sqrt{\beta}$, respectively.

If there is more than two beams in step 522, step 534 is entered where it is determined if there are more than three beams. If there is not more than three beams the process 510 continues to step 536 where first and second gain energy ratios $\alpha_1$ and $\alpha_2$ are determined according to Equations 4 and 6. In step 540, the weightings for the three beams are determined according to Rule 4a and/or 4b. If it is determined that there are more than three beams in step 534, the process 510 continues to step 544 where the weighting for the plurality of beams is determined and applied according to Rule 5 for N beams, where N is greater three.

II) Per-Beam Pilots Used at the BTS and Mobile

Some wireless communication systems and/or wireless communication protocols allow for a separate auxiliary pilot to be used in each of the beams. For example, CDMA2000 systems allow for such per-beam pilot configuration. Typically, the same Walsh code can be used in all of the beams that are used to transmit to an intended wireless device or group of devices (e.g., a wireless mobile device). If more than one beam is used to transmit to the mobile, the mobile can be instructed to demodulate the Walsh code with multiple pilots and to combine the resulting outputs.

A) Per-Beam Pilot System with Equal Beam Gains:

In some per-beam pilot systems, similar to common pilot case systems as described above, all forward link beams used to transmit to the mobile can apply equal gains to the traffic channel of interest. The BTS control over the signals is based on the determination of whether or not a beam should be turned on or off. The signal-to-noise ratios for each of two beams (e.g., $f_1$ and $f_2$), when only one or the other beam is active, has been determined to be proportional to:

$$SNR = \frac{(\|f_1\|^2)^2}{\|f_1\|^2} = \|f_1\|^2 \text{ and } SNR = \frac{(\|f_2\|^2)^2}{\|f_2\|^2} = \|f_2\|^2, \quad \text{Eq. 13}$$

respectively. The signal-to-noise ratio for a per-beam pilot system when the two beams are both active and have equal gains is proportional to:

$$SNR = \frac{\frac{1}{2}(\|f_1\|^2 + \|f_2\|^2)^2}{\|f_1\|^2 + \|f_2\|^2} = \frac{1}{2}(1+\alpha)\|f_1\|^2. \quad \text{Eq. 14}$$

where $\alpha$ is defined in Equation 4.

Based on the SNRs as defined by Equations 13 and 14, it has been found that the signal-to-noise ratio as seen at a mobile of interest is maximized according to the following Rule:

$$\text{If } \alpha \begin{cases} < 1 & \text{Beam 1 only} & SNR = \|f_1\|^2 \\ > 1 & \text{Beam 2 only} & SNR = \|f_2\|^2 \\ = 1 & \text{Beam 1 or Beam 2 or both} & SNR = \|f_1\|^2 = \|f_2\|^2 = (\|f_1\|^2 + \|f_2\|^2)/2 \end{cases} \quad \text{Rule 6}$$

It should also be noted that Rule 6 can easily be extended to an arbitrary number of beams by simply utilizing only the strongest beam to transmit to the mobile. If several beams are strongest, the mobile signal-to-noise ratio is optimized if any non-empty set of these strongest beams is used to transmit to the mobile.

If the sum energy of the two channels is normalized so that:

$$\|f_1\|^2 + \|f_2\|^2 = 1,$$

the signal-to-noise ratio as seen at the mobile resulting when Rule 6 is applied to a per-beam pilot system is given by:

$$SNR = \begin{cases} (1+\alpha)^{-1} & \alpha \leq 1 \\ (1+\alpha^{-1})^{-1} & \alpha > 1 \end{cases}. \quad \text{Eq. 15}$$

In some embodiments, Rule 6 may be altered to provide some hysterisis and/or additional cross-over so that both the first and second beams are being utilized over a slightly wider range than when the gain ratio $\alpha=1$ (e.g., $0.9<\alpha<1.1$, or some other range). This helps to satisfy the make-before-break criteria.

In situations where the mobile of interest is in an environment with high geometry, it can readily be shown that Rule 6 still applies. The resulting SNR as seen at the mobile when in a high geometry situation is proportional to:

$$SNR = \begin{cases} \alpha^{-1} & \alpha \leq 1 \\ \alpha & \alpha > 1 \end{cases}. \quad \text{Eq. 16}$$

B) Per-Beam Pilot System with Variable Control of Beam Gains:

Similar to the common pilot systems as discussed above, the signal-to-noise ratio for a per-beam system with variably controlled beam gains has been found to be proportional to:

$$SNR = \frac{\left((1-\beta)^{\frac{1}{2}} + \alpha\beta^{\frac{1}{2}}\right)^2 \|f_1\|^2}{1+\alpha}. \quad \text{Eq. 17}$$

Again, $\sqrt{\beta}$ is defined as the gain applied for a second beam with channel $f_2$, $(\sqrt{1-\beta})$ is defined as the gain for a first beam with channel $f_1$, and $\alpha$ is defined as the gain ratio $\|f_2\|^2/\|f_1\|^2$ according to Equation 4. As described above, the SNR as seen at the mobile according to Equation 17 can be maximized when:

$$\beta = \frac{\alpha^2}{1+\alpha^2}. \quad \text{Rule 7}$$

The resulting signal-to-noise ratio as seen at the mobile when Rule 7 is applied is given by:

$$SNR = \frac{(1+\alpha^2)\|f_1\|^2}{1+\alpha}. \quad \text{Eq. 18}$$

If the sum of the energy of the two channels is normalized to unity, where:

$$\|f_1\|^2 + \|f_2\|^2 = 1,$$

then, as described above, the signal-to-noise ratio when Rule 7 is applied is given by:

$$SNR = \frac{1+\alpha^2}{(1+\alpha)^2}. \qquad \text{Eq. 19}$$

In some embodiments, hysterisis can be employed to limit the on/off effects of beams, as well as to satisfy the make-before-break criteria and to provide accurate switching between signals when applying Rule 7.

The better optimized SNR as defined by Equation 19 for the per-beam pilot systems with variable beam gain control is substantially equivalent to the SNR established for the common pilot systems with variably controlled beam gains as defined by Equation 10 for some implementations. Further, the use of per-beam pilot signals can require additional power than would otherwise be required in generating common pilot signals. As a result, some embodiments do not utilize per-beam pilots where unequal weighting is applied. However, other advantages may be provided when utilizing per-beam pilots, and as such some embodiments employ per-beam pilots and utilize unequal weighting according to Rule 7.

In situations where the mobile of interest is in an environment with high geometry, it was determined that Rule 6 for high geometry situations with the per-beam, variably weighted pilots provides a better optimized SNR at the mobile than can be achieved when applying Rule 7. Further, the SNR as seen at the mobile when Rule 6 is applied in a high geometry situation with per-beam pilot systems is given by:

$$SNR = \frac{\alpha^{-2} + \alpha^2}{2}. \qquad \text{Eq. 20}$$

where a constant of proportionality has been dropped from the equation.

Figure 6:
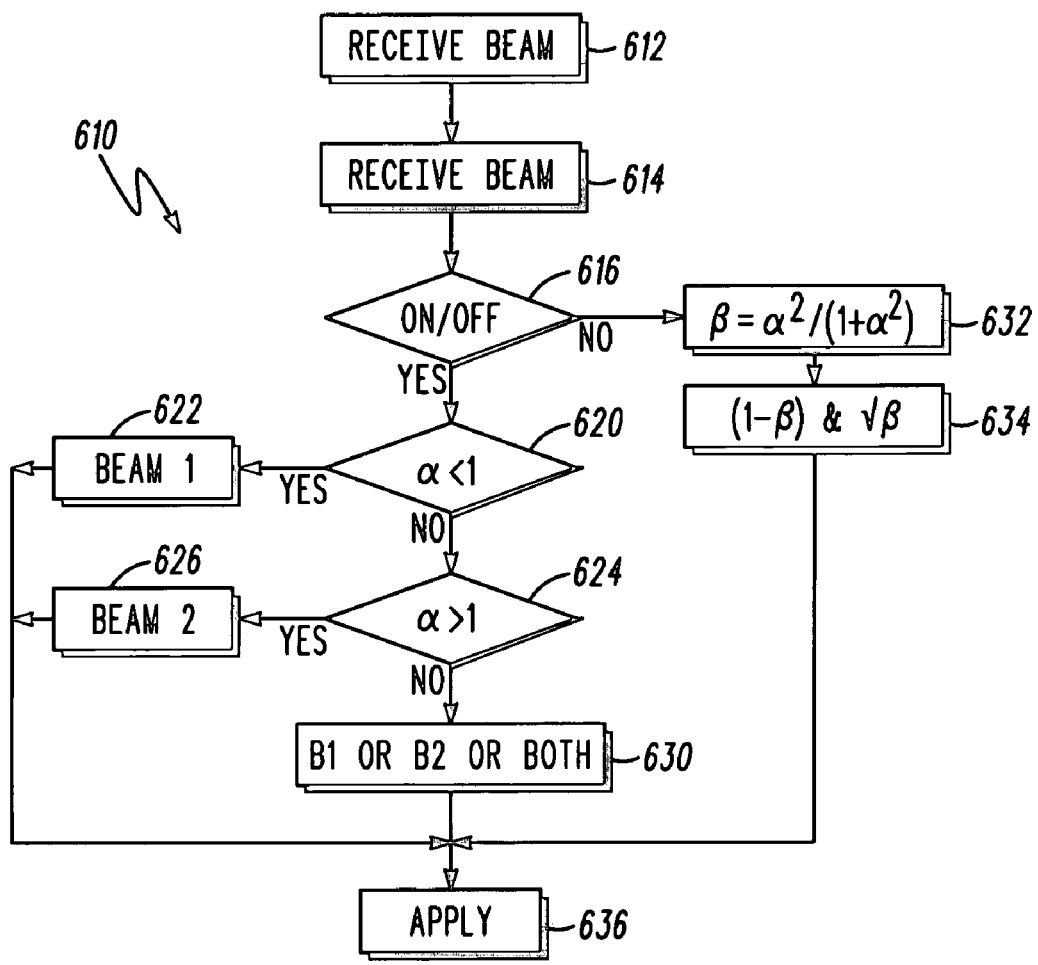
FIG. 6 depicts a simplified flow diagram of a process for determining and applying beam weighing for per-beam pilot configurations.

FIG. 6 depicts a simplified flow diagram of a process 610 for determining and applying beam weighing for per-beam pilot configurations. In step 612, one or more beams are received. In step 614, a gain ratio α is determined. In step 616, it is determined if the process is employing ON/OFF beam control. If ON/OFF beam weighting control is being used, step 620 is entered where it is determined if the gain ratio is less than 1. If the ratio is less than one, step 622 is entered where the first beam is designated as the only active beam. If the gain ratio is not less than one in step 622, the process 610 continues to step 624 where it is determined if the gain ratio is greater than 1. If the gain ratio is greater than one, step 626 is entered where the second beam is designated as the only active beam. If the gain ratio is equal to one in step 624, the process 610 continues to step 630 where the first beam, or the second beam, or both beams are designated as ON (where the first and second beams have equal weighting when both are ON).

If it was determined in step 616 that the beam weighting control is not ON/OFF control, the process 610 continues to step 632 where a gain factor β is determined according to Rule 7 based on the gain ratio α. In step 634 the weighting for the first and second beams are determined according to $\sqrt{1-\beta}$ and $\sqrt{\beta}$, respectively. Following steps 622, 626, 630 and 634, the determined weighting is applied in the generation of one or more forward link beams.

In comparing the performance systems utilizing ON/OFF control and variable beam gain control for common pilot verses per-beam pilot implementations, additional factors are taken into account. In systems with per-beam pilots, it is not immediately clear that variably weighting the beams yields better performance than ON/OFF control, as it does in the common pilot systems, because with per beam pilots, no finger is assigned if the beam is turned off. As a result, less noise is introduced into the demodulator. Comparing the signal-to-noise ratio for ON/OFF control to the signal-to-noise ratio for variable beam weighting, it is observed that:

$$\frac{1+\alpha^2}{(1+\alpha)^2} \leq \begin{cases} (1+\alpha)^{-1} & \alpha \leq 1 \\ (1+\alpha^{-1})^{-1} & \alpha > 1 \end{cases}. \qquad \text{Eq. 21}$$

Based on this comparison, it appears that there may be no benefit in using both beams simultaneously and weighting them individually in per-beam systems. As such, in some embodiments, utilizing per-beam pilots, only the stronger beam is used to transmit to the mobile, similar to some implementations for the common pilot system described above. However, other advantages may be provided when utilizing per-beam pilots, and as such some embodiments do employ per-beam pilots while applying unequal weighting. Additionally, in those embodiments where the reverse link measurements as determined by the BTS do not precisely represent the current state of the forward beam channels, per-beam pilots with unequal weighting as defined above according to Rule 7 can be utilized to allow for and/or compensate for this imperfect knowledge of the channel.

Figure 7:
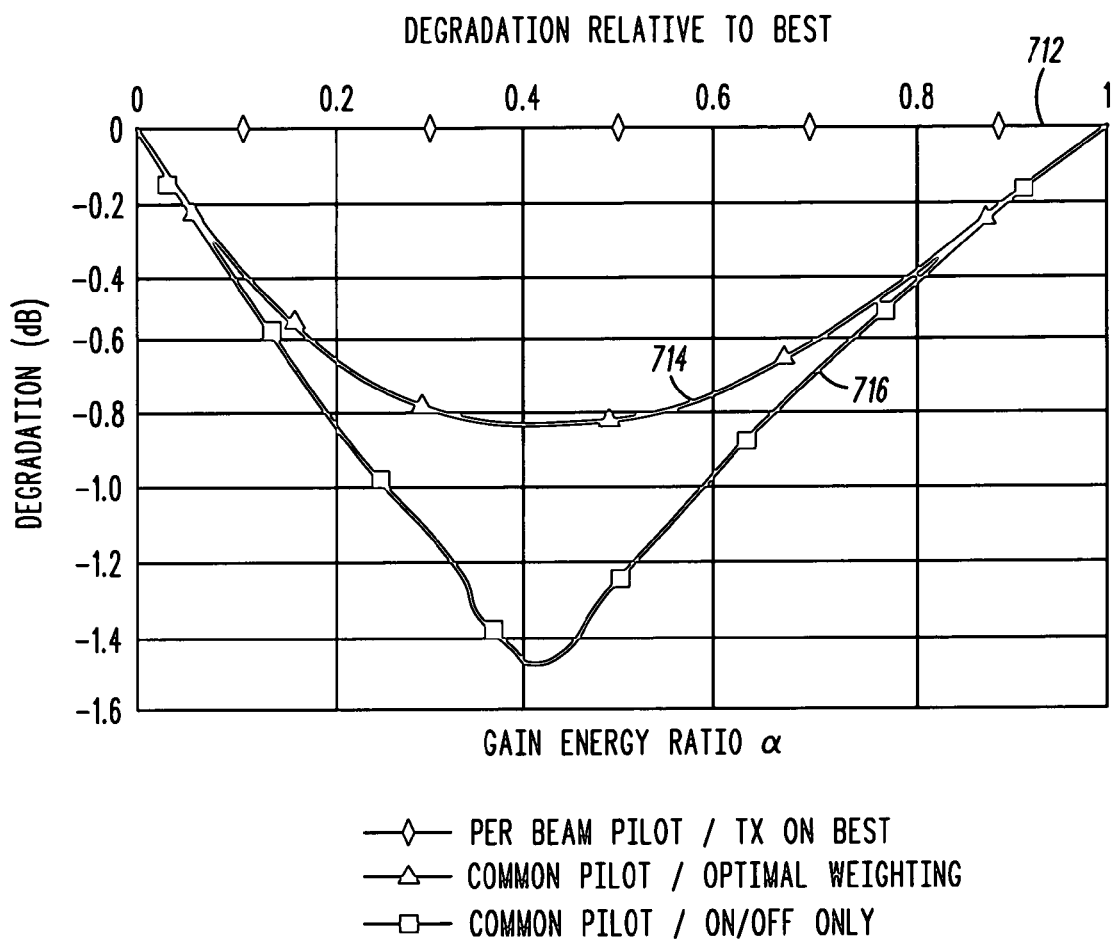
FIG. 7 depicts a simplified graphical representation of a comparison of the signal-to-noise ratios achievable with common and per beam pilots as utilized in some embodiments.

FIG. 7 depicts a simplified graphical representation of a comparison of the signal-to-noise ratios achievable with common and per beam pilots. The graphical representation shows the degradation of the signal-to-noise ratio relative to a defined best performance. In this instance, the best performance is achieved by a per-beam pilot system communicating only on the best or strongest beam of two beams 712. A signal-to-noise ratio 714 is shown for a common pilot system providing optimal weighting of two beams that demonstrates a better performance relative to the defined best over a signal-to-noise ratio 716 achieved through a common pilot system providing ON/OFF control. As above, the sum energy of the two channels is normalized to unity. The signal-to noise ratio as represented in FIG. 7 is only given for $0 \leq \alpha \leq 1$. The performance for $\alpha > 1$ can be easily found by using the fact that the signal-to-noise ratio for a given value of α is substantially the same as obtained for $\alpha^{-1}$.

III) Per-User Signal Supported by the BTS and Mobile

In providing per-user pilot signals, the weighting determined for a traffic signal is typically identical to the weighting utilized for the user pilot signal. As a result, the per-user pilots are only utilized with variable gain control. The signal-to-noise ratio at the mobile for per-user pilots was determined to be proportional to:

$$SNR = \frac{((1-\beta)\|f_1\|^2 + \beta\|f_2\|^2)^2}{(1-\beta)\|f_1\|^2 + \beta\|f_2\|^2} = (1 + (\alpha - 1)\beta)\|f_1\|^2. \quad \text{Eq. 22}$$

Further, it was determined that the signal-to-noise ratio of Equation 22 is maximized if:

$$\beta = \begin{cases} 0 & \alpha \leq 1 \\ 1 & \alpha > 1 \end{cases}, \quad \text{Rule 8}$$

where the gain energy ratio $\alpha$ is defined by $\|f_2\|^2/\|f_1\|^2$, and $\sqrt{1-\beta}$ and $\sqrt{\beta}$ are defined as the gains applied for the first and second beams, respectively. In some embodiments, Rule 8 may be altered slightly to provide some hysterisis and/or additional cross-over to help satisfy the make-before-break criteria.

When the sum of the channel energies is normalized to unity, the resulting signal-to-noise ratio is given by $$SNR = \begin{cases} (1+\alpha)^{-1} & \alpha \leq 1 \\ (1+\alpha^{-1})^{-1} & \alpha > 1 \end{cases}, \quad \text{Eq. 23}$$

which is the same result as determined with per-beam pilots (see Equation 15). As such, it seems that per-user pilots do not yield additional benefits with regard to optimizing the SNR than can be achieved with per-beam pilots, under the assumptions of low geometry and knowledge of the channel energies $\|f_1\|^2$ and $\|f_2\|^2$ at the transmitter (on average, due to reciprocity as described above).

The implementation of per-user pilots can require additional power and system complexity. Therefore, some embodiments limit or avoid the use of per-user pilots and simply employ per-beam pilots with ON/OFF control and/or common pilots. However, other advantages and reductions in SNR due to other factors may be provided when utilizing per-user pilots. As such, some embodiments do employ per-user pilots while applying weighting according to Rule 8 to better optimize the SNR at the mobile.

In situations where per-user pilots are utilized and the mobile of interest is in an environment with high geometry, the Rule 8 can still be employed to provide desired weighting. The optimizing of the SNR while applying Rule 8 for high geometry situations was determined to be:

$$SNR = \begin{cases} \alpha^{-1} & \alpha \leq 1 \\ \alpha & \alpha > 1 \end{cases}. \quad \text{Eq. 24}$$

Figure 8:
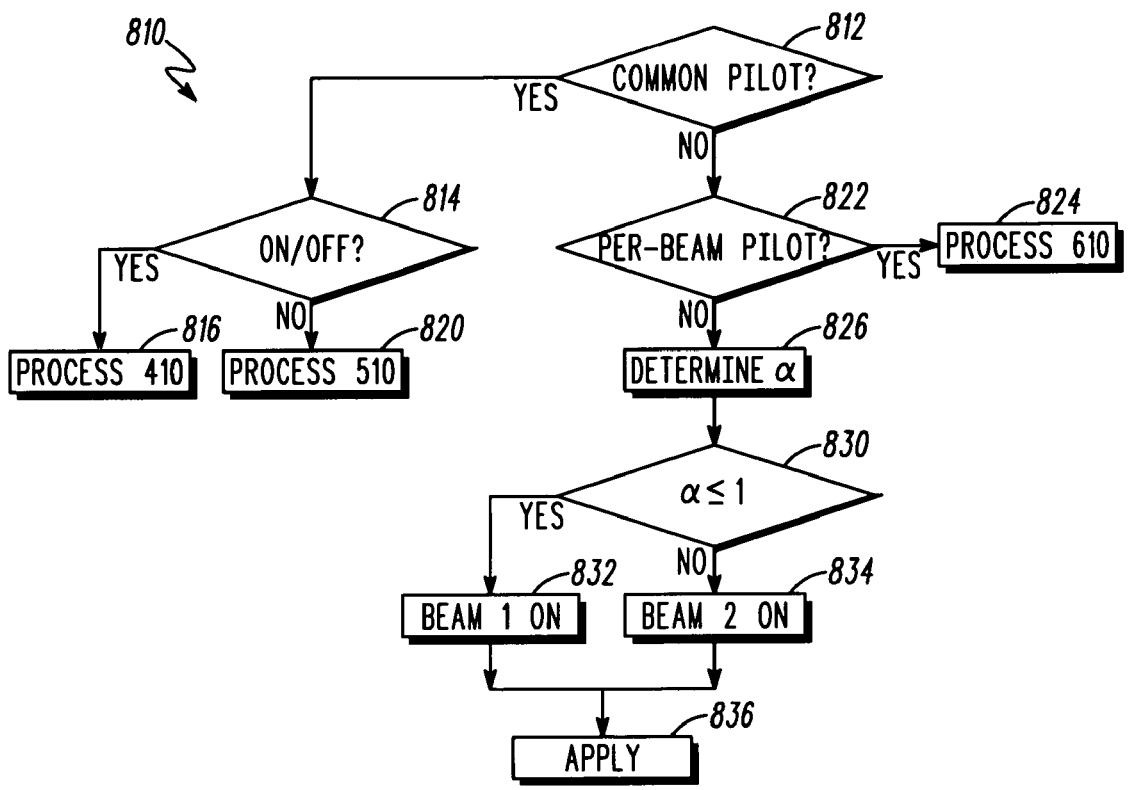
FIG. 8 depicts a simplified flow diagram of a process for use in determining beam weighting according to some embodiments.

FIG. 8 depicts a simplified flow diagram of a process 810 for use in determining beam weighting for a mobile. In step 812, it is determined if the pilot beam configuration being used is the common pilot beam configuration. If the pilot configuration is the common pilot configuration, step 814 is entered where it is determined if the beam weighting control is the ON/OFF control. If the control is ON/OFF, the process continues to step 816 where the process 410 of FIG. 4 is applied and beam weighting is determined. If it is determined in step 814 that the control is not ON/OFF, the process continues to step 820 where the process 510 of FIG. 5 is implemented for variable beam weighting control.

If it is found in step 812 that the beam configuration is not common pilot, step 822 is entered where it is determined if the pilot configuration is the per-beam pilot configuration. If it is per-beam pilot step 824 is entered where process 610 of FIG. 6 is implemented to provide beam weighting. If it is determined that the pilot configuration is not per-beam pilot, step 826 is entered where a gain energy ratio $\alpha$ is determined. In step 830, it is determined if the ratio is less than or equal to one (1). If it is less than or equal to one, the process continues to step 832 where a first beam is activated to the ON state with full weighting. If the ratio is not less than or equal to one, step 834 is entered where a second beam is activated to the ON state with full weighting. The process then continues to step 836 where the weighting is applied for the generation of signals over the forward link beams. In a general sense, the process 810 determines the pilot configuration, whether a common pilot configuration, a per-beam configuration or per-user configuration, and further determines a selected type of beam weighting, whether ON/OFF weighting control or variable weighting control. Once the pilot configuration in known and type of beam weighting is selected, rules can be selected to determine the number of beams to use along with the accurate weight of those beams for forward link communications. When a system is providing communication for a plurality of mobile devices, the process 810 is typically implemented individually for each mobile being communicated with in an attempt to better optimize individual weighting for each mobile.

Figure 9:
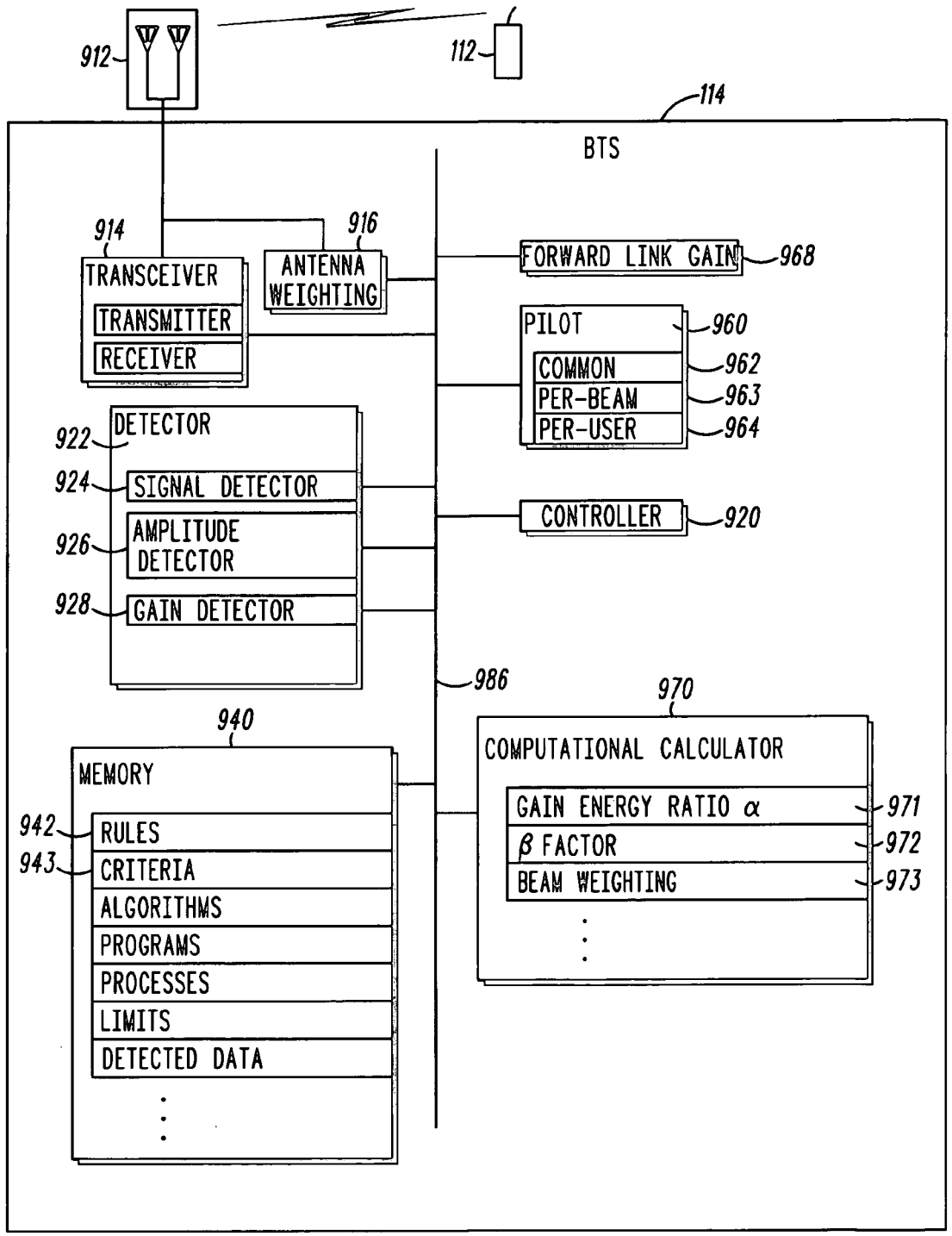
FIG. 9 depicts a simplified block diagram of a base station or base transceiver station (BTS) according to some embodiments.

FIG. 9 depicts a simplified block diagram of a base station or base transceiver station (BTS) 114 according to some embodiments. The BTS wirelessly communicates with one or more mobile devices 112 over pilot and/or traffic channels. The BTS can be configured to generate common pilot signals, per-beam pilot signals, per-user pilot signals, and/or combinations there of over one or more beams.

The BTS includes one or more antennas 912, which can be implemented as an array of antenna elements. The antennas are connected with a transceiver 914. The transceiver includes a transmitter for formatting and transmitting out going communications, including pilot and/or traffic signals, over at least the forward link beams to the mobiles 112 or other wireless devices, and a receiver for receiving, processing, demodulating, decoding and other similar processing of signals received over at least the reverse link beams.

An antenna weighting device 916 can also be included that applies antenna weighting to the one or more antenna arrays 912 as determined by the BTS according to pilot beam configuration and/or beam weighting control. In some embodiments, the weighting device 916 can be included in the transceiver 914 or in a controller 920, or other components of the BTS 114.

Received signals are forwarded from the transceiver 914 to a reverse link signal detector 922. The detector 922 can include a signal detector 924 that detects signals received over a number of beams from each mobile, an amplitude detector 926 for detecting amplitudes and/or magnitudes of reverse link communications, a gain detector 928 that can detect a gain of a signal from each mobile, and other similar detectors.

In some embodiments, the indication of detected signals, amplitude and gains for each mobile are forwarded to the controller 920. The controller utilizes the detected information to determine a number of signals being received. The detected information can additionally be directed by the detector 922 and/or controller 920 to a calculator 970. In some embodiments the detected information can further be stored temporarily or permanently in a memory 940.

The calculator 970 can utilize the detected information to perform calculations. In some embodiments, the calculator can include a gain energy ratio α calculator 971 for calculating first, second, third, etc. gain energy ratios ($\alpha_1$, $\alpha_2$, $\alpha_3$, ... $\alpha_n$). A gain factor calculator 972 can be included to determine gain factors β. The calculator 970 further includes a beam weighting calculator 973 that determines weighting according to the defined Rule 942 stored in memory, in the calculator 970 and/or controller 920, such as Rules 1-8 as defined above. The calculator can be implemented through a processor, microprocessor, ASIC, computer, combination of processors, microprocessors and/or computers, and/or other devices providing computational processing. In some embodiments, the calculator is part of the controller 920.

These embodiments typically include a pilot device 960 that provides pilot signal generation. The pilot device 960 can include a common pilot generator 962, a per-beam pilot generator 963, and/or a per-user pilot generator 964. The pilot device can generate one or more types of pilots as dictated by the controller 920.

The controller 920 provides control over the BTS 114 and the components of the BTS. One or more buses 986 can be included to allow coupling and communication between the controller and the components of the BTS, as well as communication between the components. Alternatively and/or additionally, direct coupling can be utilized. The controller 920 can be implemented through substantially any processor, microprocessor, computer, ASIC, other devices providing computational processing and/or combinations thereof. The memory 940 can store the Rule 942, criteria for determining viable signals 943, algorithms, programs, processes, limits and other data, information and controls. Examples of the criteria and/or limits can include the criteria limits of the gain energy ratio to determine at least the ON/OFF control weighting of forward link beams.

In some embodiments, the BTS 114 additionally includes a forward link gain device 968. The forward link gain can generate gains to be applied on top of the weighting to forward link traffic signals. The gains can be determined by the forward link gain device 968 based on the communication channels, fading, multi-path, interference, data received from a mobile and other parameters as is known in the art. Alternatively and/or additionally, the gain device 968 can receive gain information from the controller 920 and/or the computation calculator 970.

The present embodiments address the problems associated with sub-dividing sectorized antennas into switched barn implementations for finer power regulation on CDMA forward links. This conversion allows wireless communication systems to limit the wireless communication to narrower beams, as apposed to an entire sector. These narrower beams approaches can be implemented by switching ON and OFF narrower sub-beams within a sector. Additionally and/or alternatively, the present embodiments can additionally determine better optimized weighting for forward link beams based on energy gains of reverse link beams. These embodiments further optimize the maintenance of connections with wireless communication devices through the switched beam antenna forward link communications.

The embodiments determine how one or more forward link beams can more optimally communicate an intended wireless device or devices through the use of measured metrics and the application of predefined criteria. These embodiments can employ reverse link antennas that are configured substantially the same as forward link beams. Reverse link beam energy gains are utilized to better optimize signal-to-noise ratio as seen at the wireless device by applying the defined rules to determine which of one or more forward link beams are to service a wireless device of interest. The present embodiments further provide a transmission power distribution method and system that uses the reverse link metrics to determine and apply distributed power on forward link beams. Further, the present embodiments maintain switched beam antennas through a better optimized method that minimizes energy transmitted on the forward link beams. These advantages are achieved in part through the use of rules applied to reverse link metrics to control the number and/or gain weighting of forward link beams. The present embodiments preferably determine weightings individually for each mobile of a system according to measured reverse link energy.

While the invention herein disclosed has been described by means of specific embodiments and applications thereof, numerous modifications and variations could be made thereto by those skilled in the art without departing from the scope of the invention set forth in the claims.

What is claimed is:

1. A method for use in providing wireless communication, comprising:

selecting a pilot beam configuration for wireless communication, wherein the beam configuration uses at least two beams and the at least two beams are fixed beams;

selecting a beam weighting control;

receiving at least one wireless communication through at least a first reverse link beam;

determining a first gain energy received through the first reverse beam;

determining a first gain energy ratio according to at least the first gain energy;

determining a weighting of at least a first forward link beam according to the selected beam weighting control and the first gain energy ratio;

receiving the wireless communication through a second reverse link beam;

determining a second gain energy received through the second beam and wherein the determining the first gain energy ratio comprises determining a ratio of the first and second gain energies;

receiving the wireless communication through a third reverse link beam;

determining a third gain energy received through the third reverse beam;

determining a second gain energy ratio of the first and third gain energies;

determining a weighting of at least the first forward link beam according to the first and second gain energy ratios;

receiving n number of reverse link beams;

determining n−1 gain energy ratios $\alpha_i$, for i=1 to n; and determining weighting $b_i$ of at least one of n number of forward link beams according:

$$b_i = \frac{(\alpha_{i-1})^2}{\left(1 + \sum_{j=1}^{n-1} \alpha_j\right)}.$$

2. A method for use in providing wireless communication, comprising:
- selecting a pilot beam configuration for wireless communication, wherein the beam configuration uses at least two beams and the at least two beams are fixed beams;
- selecting a beam weighting control;
- receiving at least one wireless communication through at least a first reverse link beam;
- determining a first gain energy received through the first reverse beam;
- determining a first gain energy ratio according to at least the first gain energy;
- determining a weighting of at least a first forward link beam according to the selected beam weighting control and the first gain energy ratio;
- receiving the wireless communication through a second reverse link beam;
- determining a second gain energy received through the second beam and wherein the determining the first gain energy ratio comprises determining a ratio of the first and second gain energies;
- determining a weighting of a second forward link beam according to the first gain energy ratio such that the weighting of the second forward beam is about equal to the square root of a product of a square of the first gain energy ratio divided by a sum of one plus the square of the first gain ratio; and
- wherein the determining the weighing of at least the first forward beam further comprises determining the weighting of the first forward beam such that the weighting of the first forward beam is about equal to one minus the weighting for the second forward beam.

3. A method for use in providing wireless communication, comprising:
- selecting a pilot beam configuration for wireless communication, wherein the beam configuration uses at least two beams and the at least two beams are fixed beams;
- selecting a beam weighting control;
- receiving at least one wireless communication through at least a first reverse link beam;
- determining a first gain energy received through the first reverse beam;
- determining a first gain energy ratio according to at least the first gain energy;
- determining a weighting of at least a first forward link beam according to the selected beam weighting control and the first gain energy ratio;
- receiving the wireless communication through a second reverse link beam;
- determining a second gain energy received through the second beam and wherein the determining the first gain energy ratio comprises determining a ratio of the first and second gain energies;
- determining when the first gain energy ratio is less one (1), and wherein the determining the weighing comprises communicating only over the first forward link beam;
- determining when the first gain energy ratio is greater than one (1), and wherein the determining the weighing comprises communicating only over a second forward link beam; and
- determining when the first gain energy ratio is about equal with one (1), and wherein the determining the weighing comprises communicating over both the first and second forward link beams with equal weighting.

4. A method for use in providing wireless communication, comprising:
- selecting a pilot beam configuration for wireless communication, wherein the beam configuration uses at least two beams and the at least two beams are fixed beams;
- selecting a beam weighting control;
- receiving at least one wireless communication through at least a first reverse link beam;
- determining a first gain energy received through the first reverse beam;
- determining a first gain energy ratio according to at least the first gain energy;
- determining a weighting of at least a first forward link beam according to the selected beam weighting control and the first gain energy ratio;
- receiving the wireless communication through a second reverse link beam;
- determining a second gain energy received through the second beam and wherein the determining the first gain energy ratio comprises determining a ratio of the first and second gain energies;
- determining when the first gain energy ratio is greater than or equal to one (1), and wherein the determining the weighing comprises communicating only over the first forward beam; and
- determining when the first gain energy ratio is less than one (1), and wherein the determining the weighing comprises communicating only over a second forward link beam.

5. A method for use in providing wireless communication comprising:
- selecting a pilot beam configuration for wireless communication;
- selecting a beam weighting control;
- receiving at least one wireless communication through at least a first reverse link beam;
- determining a first gain energy received through the first reverse beam;
- determining a first gain energy ratio according to at least the first gain energy;
- determining a weighting of at least a first forward link beam according to the selected beam weighting control and the first gain energy ratio;
- receiving the wireless communication through a second reverse link beam;
- determining a second gain energy received through the second beam and wherein the determining the first gain energy ratio comprises determining a ratio of the first and second gain energies;
- receiving the wireless communication through a third reverse link beam;
- determining a third gain energy received through the third reverse beam;
- determining a second gain energy ratio of the first and third gain energies;
- determining a weighing of at least the first forward link beam according ot the first and second gain energy ratios;
- receiving n number of reverse link beams;
- determining n−1 gain energy ratios $\alpha_i$, for i=1 to n; and
- determining weighting $b_i$ of at least one of n number of forward link beams according:

$$b_i = \frac{(\alpha_{i-1})^2}{\left(1 + \sum_{j=1}^{n-1} \alpha_j\right)}.$$

6. A method for use in providing wireless communication comprising:
- selecting a pilot beam configuration for wireless communication;
- selecting a beam weighting control;
- receiving at least one wireless communication through at least a first reverse link beam;
- determining a first gain energy received through the first reverse beam;
- determining a first gain energy ratio according to at least the first gain energy;
- determining a weighting of at least a first forward link beam according to the selected beam weighting control and the first gain energy ratio;
- receiving the wireless communication through a second reverse link beam;
- determining a second gain energy received through the second beam and wherein the determining the first gain energy ratio comprises determining a ratio of the first and second gain energies;
- determining a weighting of a second forward link beam according ot the first gain energy ratio such that the weighting of the second forward beam is about equal to the square root of a product of a square of the first gain energy ratio divided by a sum of one plus the square of the first gain ratio; and
- wherein the determining weighting of at least the first forward beam further comprises determining the weighting of the first forward beam such that the weighting of the first forward beam is about equal to one minus the weighting for the second forward beam.

7. A method for use in providing wireless communication comprising:
- selecting a pilot beam configuration for wireless communication;
- selecting a beam weighting control;
- receiving at least one wireless communication through at least a first reverse link beam;
- determining a first gain energy received through the first reverse beam;
- determining a first gain energy ratio according to at least the first gain energy;
- determining a weighting of at least a first forward link beam according to the selected beam weighting control and the first gain energy ratio;
- receiving the wireless communication through a second reverse link beam;
- determining a second gain energy received through the second beam and wherein the determining the first gain energy ratio comprises determining a ratio of the first and second gain energies;
- receiving n number of reverse link beams;
- determining n−1 gain energy ratios $\alpha_i$, for i=1 to n; and
- determining weighting $b_i$ of at least one of n number of forward link beams according:

$$b_i = \frac{(\alpha_{i-1})^2}{\left(1 + \sum_{j=1}^{n-1} \alpha_j\right)}.$$

* * * * *